(12) United States Patent
Lee et al.

(10) Patent No.: US 7,907,343 B2
(45) Date of Patent: Mar. 15, 2011

(54) COMPOSITE OPTICAL DIVIDING DEVICE

(75) Inventors: Chi-Hung Lee, Tainan County (TW);
Yu-Nan Pao, Hsinchu County (TW);
Hui-Hsiung Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/242,934

(22) Filed: Oct. 1, 2008

(65) Prior Publication Data
US 2009/0316274 A1 Dec. 24, 2009

(30) Foreign Application Priority Data
Jun. 24, 2008 (TW) .............................. 97123560 A

(51) Int. Cl.
*G02B 27/14* (2006.01)
(52) U.S. Cl. .......................... 359/634; 359/621; 359/625
(58) Field of Classification Search .................. 359/619, 359/621, 622, 625, 634
See application file for complete search history.

(56) References Cited

U.S. PATENT DOCUMENTS

| 4,807,978 | A | | 2/1989 | Grinberg et al. |
| 5,615,024 | A | | 3/1997 | May et al. |
| 5,682,265 | A | * | 10/1997 | Farn et al. ...................... 359/571 |
| 5,764,389 | A | | 6/1998 | Grinberg et al. |

FOREIGN PATENT DOCUMENTS

| JP | 09-284684 | 10/1997 |
| JP | 2000-503456 | 3/2000 |
| TW | M249217 | 11/2004 |

OTHER PUBLICATIONS

"Office Action of Japan Counterpart Application", issued on Nov. 9, 2010, p1-p3, in which the listed references were cited.

* cited by examiner

*Primary Examiner* — Joseph Martinez
(74) *Attorney, Agent, or Firm* — Jianq Chyun IP Office

(57) ABSTRACT

A composite optical dividing device can receive a light beam, which is mixed with at least multiple wavelength ranges of light. The optical dividing device includes a first optical film plate and a second optical film plate. The first optical film plate has multiple micro-structure lenses in same shape, for deflecting and the incident light with a condense level. The second optical film plate has multiple periodic polygon structures, for receiving the deflected light and dividing constitutions of the light beam, according to the wavelength ranges. Each of the multiple ranges of light respectively travels toward a predetermined region on a plane.

6 Claims, 16 Drawing Sheets

COMPOSITE OPTICAL DIVIDING DEVICE

CROSS-REFERENCE TO RELATED APPLICATION

This application claims the priority benefit of Taiwan application serial no. 97123560, filed on Jun. 24, 2008. The entirety of the above-mentioned patent application is hereby incorporated by reference herein and made a part of specification.

BACKGROUND OF THE INVENTION

1. Field of the Invention

The present invention generally relates to a composite optical dividing device for use in an image display apparatus to divide a light into multiple light beams of different wavelengths.

2. Description of Related Art

A main purpose of optical dividing devices is, for example, to divide a white light into red. (R), green (G), and blue (B) light beams, or other color light beams. The design of the optical dividing mechanism and structure of the optical dividing device varies with the apparatus in which the optical dividing device is used. In prior arts, the red, green, and blue lights can be obtained by color filters (CF) of respective colors.

In a flat display, a backlight source is often used in combination with a spatial light modulator and a color filter to present full-color images. In an image sensor of a digital camera, a color filter is also used in combination with color difference calculation to reproduce the color of an original object. In larger systems such as a color video camera or a back projection TV, a three-plate or two-plate prism set or a color filter is used in combination with a collimated light source to present full-color images. When the color filter is used in such systems, because each shading pixel can only present a single primary color of the RGB three primary colors, about two-thirds of energy of the incident white light is absorbed, thus decreasing the efficiency of using the light and shortening the lifespan of the battery. In addition, fabrication of the color filter can be rather complex and more than one semiconductor photolithography processes are needed for each primary color, which results in a high cost.

The industry has been continuing the research of optical elements, for example, as a substitute for the color filter, which is expected to produce three primary color light beams that correspond to pixels of a display panel and are incident onto a liquid crystal layer at a right-angle while maintaining a high optical efficiency.

SUMMARY OF THE INVENTION

Accordingly, the present invention is directed to a composite optical dividing device that can split an incident light into multiple primary color light beams based on the difference in wavelengths without using the color filter. The composite optical dividing device may be used, for example, in an image display apparatus.

The present invention provides a composite optical dividing device for receiving a light beam. The light beam is a mixture of multiple light beams of different wavelengths. The composite optical dividing device includes a first optical film and a second optical film. The first optical film includes multiple micro-structure lenses of a same shape. Each of the micro-structure lenses receives the light beam to generate a condensed and deflected light. The second optical film includes multiple periodic polygon structures for receiving the deflected light to divide the deflected light into the light beams of different wavelengths. Each of the light beams of different wavelengths is directed toward a respective predetermined area on a plane according to its respective wavelength.

The present invention also provides a composite optical dividing device for receiving an incident light beam. The incident light beam is a mixture of multiple light beams of different wavelengths. The composite optical dividing device includes an optical film having a light incident surface and a light emergence surface. The light incident surface is provided with a plurality of micro-structure lenses of a same shape, and each of the micro-structure lens is configured to condense and deflect the incident light beam. The light emergence surface is provided with a plurality of periodic polygon structures for receiving the incident light beam passing through the light incident surface and dividing the incident light beam into the light beams of different wavelengths.

In order to make the aforementioned and other features and advantages of the present invention more comprehensible, embodiments accompanied with figures are described in detail below.

DESCRIPTION OF THE EMBODIMENTS

Figure 1A:
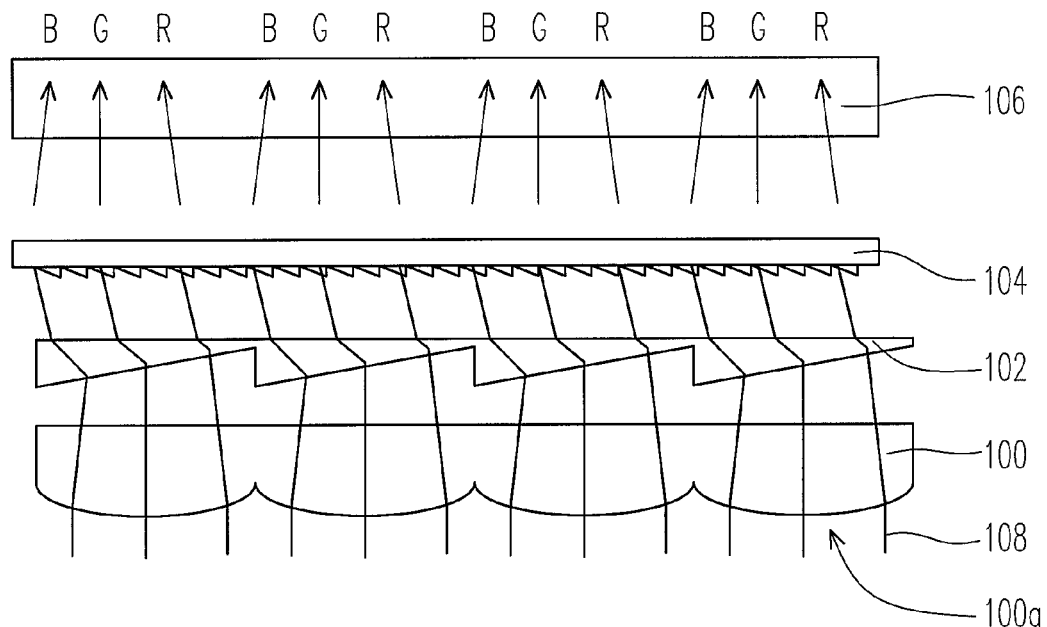
FIGS. 1A-1C are cross-sectional views of composite optical dividing devices employed in an image display apparatus system according to one embodiment of the present invention.

The optical dividing mechanism of the composite optical dividing device of the present invention is, for example, a combination of first and second optical films each having periodic polygon structures. The periodic polygon structures of the first optical film are configured to condense an incident light in a predetermined degree as well as deflect the incident light. The period polygon structures of the second optical film are configured to divide the deflected light into light beams of different wavelengths, which are separated according to their respective wavelengths and emerge from the second optical film in a direction that is, for example, substantially parallel to the incident direction. The present invention can be utilized in a wide range of applications, such as, replacing the color filter (CF) in the display panel, image sensor, or color video camera with the optical film containing two polygon structure films, which at least can increase the efficiency of using the light and reduce the system complexity.

The periodic polygon structures of the first film form a plurality of micro-structure lenses. The light beam passing through each micro-structure lens is appropriately deflected and condensed. The appropriately deflected and condensed light beam is then split into component light beams of different wavelengths that are directed in a predetermined direction or to predetermined positions by a corresponding periodic polygon structure of the second film under a diffraction action. The periodic polygon structure may be, for example, a common periodic polygon optical structure or alternatively a grating. In one embodiment of the present invention, the grating structure may be, for example, a blazed grating which has a good beam-dividing performance as well as high diffraction efficiency. An angle of the incident light relative to the inclined plane of the grating can be adjusted to make the direction of the diffracted light becomes the same as the direction of the refracted light when the grating facet is used as a refraction plane. In this case, a maximum of the diffraction efficiency in the diffraction direction (or the refraction direction of the facet) can be achieved.

The present invention may also employ a combination of the periodic polygon aspheric lenses and blazed grating to achieve high efficiency spectrum dividing without changing the direction of the incident light. The present invention can be used, for example, to replace the traditional color filter to increase the optical efficiency. When compared with the traditional system using the color filter, the present invention may improve the efficiency of using the light by using the polarization characteristics of the incident light when the present invention is utilized in a display panel or an opto-mechanical system.

Description of embodiments of the present invention is made below to enable those skilled in the art to better understand the present invention. However, it is intended that the present invent should not be limited to the embodiments described herein. In addition, various embodiments described herein may be practiced in combination with one another in some ways.

Figure 1B:
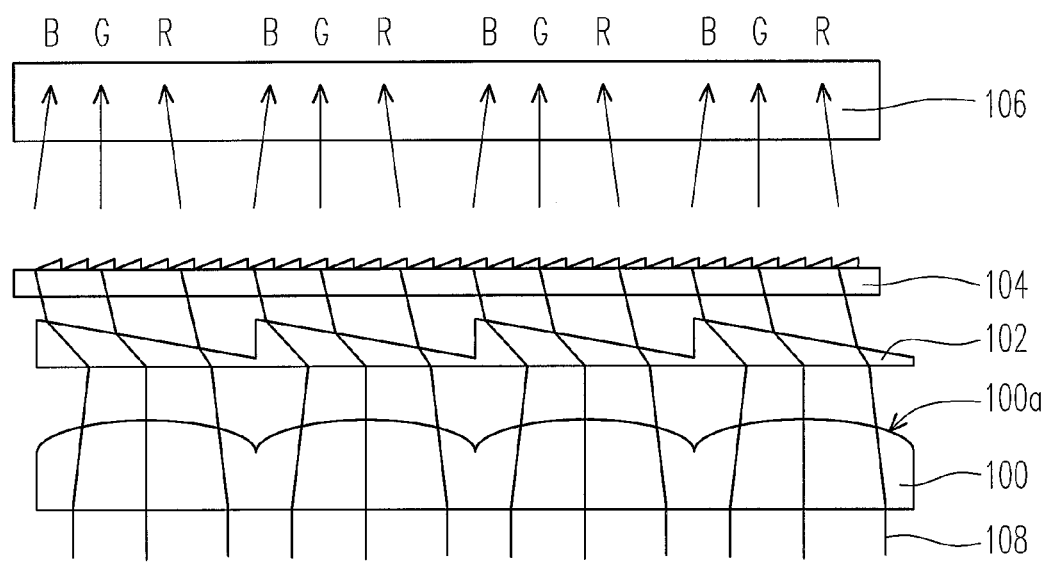
Figure 1C:
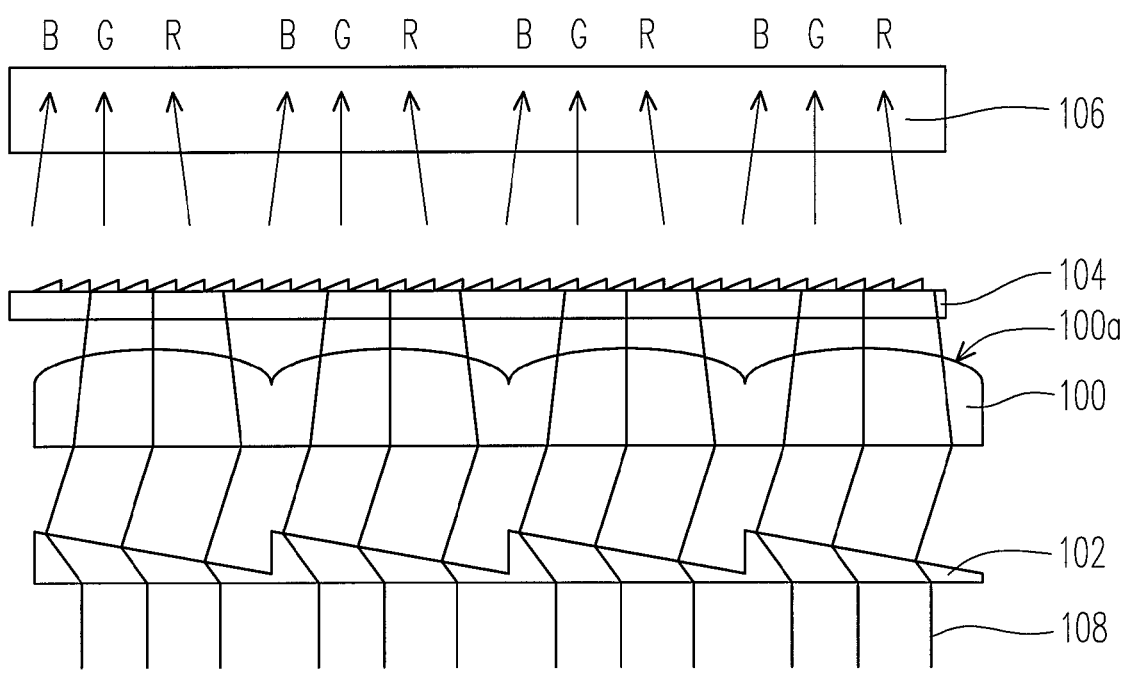

FIGS. 1A through 1C illustrate cross-sectional views of composite optical dividing devices having a three-piece structure according to embodiments of the present invention, which are used in an image display apparatus system. Referring to FIG. 1A, the composite optical dividing device includes, for example, a first optical film and a second optical film. In this illustrated embodiment, the first optical film consists of, for example, a micro lens plate 100 and a prism plate 102. The prism plate 102 is, for example, a grating and can be constructed to have a long period according to the desired pixel resolution. The micro lens plate 100 includes a plurality of micro lenses 100a. The micro lens 100a may be, for example, a micro lens having a curved surface with center symmetry. More specifically, the micro lens 100a may be, for example, a micro lens having a cylindrical or spherical lens curved surface. This curved surface is used to produce the light condensing result. The micro lenses 100a are arranged, for example, in positional correspondence with a plurality of pixels behind, and may be cylindrical or spherical lens units arranged in one-dimension or two-dimension. FIG. 1A illustrates a plurality of pixels on one scan line, for example. The prism plate 102 includes a plurality of micro prism units, and each of the micro prism units and a corresponding one of the micro lenses collectively form a micro-structure lens. The micro-structure lens receives a light beam 108 and produces a deflected and condensed light beam. The light path illustrated in the drawing is used to show the micro-structure lens is capable of condensing the light beam with a certain degree and deflecting the light beam as it travels. The prism unit may be a polygon structure, for example, a right-angle prism. However, the micro-structure lenses formed by the micro lens plate 100 and the prism plate 102 should not be limited to the structures described herein and can be modified as desired. Several variations made to the micro-structure lens to achieve desired functions are described below.

The incident light beam 108 is, for example, a mixture of a plurality of primary color light, and may be a white light. The primary color lights can be divided into lights of different wavelengths, for example, red, green, and blue (RGB) three primary color lights. However, other primary color lights can also be used according to actual needs.

The light beam 108 passing through the micro lens plate 100 and the prism plate 102 is incident on the second optical film such as a diffractive grating plate 104. The diffractive grating plate 104 includes a plurality of periodic polygon structures that receive the condensed and deflected light beam 108 to divide it into lights of different wavelengths. For example, the light beam is divided into R, G, B lights according to their wavelengths and each of the R, G, B lights is directed toward a predetermined area on a plane. In the illustrated embodiment, the plane is, for example, an incident plane of an image display apparatus 106, and the predetermined area on the incident plane is, for example, one of a plurality of sub-pixel positions of a plurality of pixels of a pixel array.

It is well known that a color pixel is made up of several sub-pixels, for example, R, G, B sub-pixels. The R, G, B sub-pixels having their respective grey levels are combined to produce the desired color pixel. In the present invention, the color filter is not required. Instead, the diffractive grating plate 104 is used to divide the multiple lights of different wavelengths, and the divided multiple lights of different wavelengths can still maintain their original travel directions and can be incident on their respective predetermined sub-pixel positions.

Referring to FIG. 1B, different from FIG. 1A in which the lens curved surface of the micro lens plate 100 is disposed on a bottom surface of the micro lens plate 100 (the bottom surface is defined as an incident surface), the lens curved surface may be disposed on a top surface of the micro lens plate 100 (the top surface is defined as an emergence surface) according to process or design requirements. In addition, the structure surface of the prism plate 102 is not limited to the bottom surface and could be disposed on the top surface thereof according to process or design requirements. The structure surface of the diffractive grating plate 104 is not limited to the bottom surface and could be disposed on the top surface according to process and design requirements. Referring to FIG. 1C, in this embodiment, the positions of the micro lens plate 100 and the prism plate 102 are interchanged. Both the lens curved surface of the micro lens plate 100 and the structure surface of the prism plate 102 can be disposed on the top surface or bottom surface (the bottom surface is defined as the light incident surface). In addition, the structure surface of the diffractive grating plate 104 is also not limited to the bottom surface and could be disposed on the top surface according to process or design requirements. The structures of FIGS. 1A, 1B and 1C can all be used by embodiments of the present invention, which can produce three primary color lights corresponding to the pixels of a display panel and approximately perpendicularly incident onto a liquid crystal layer while maintaining a high optical efficiency.

Figure 2:
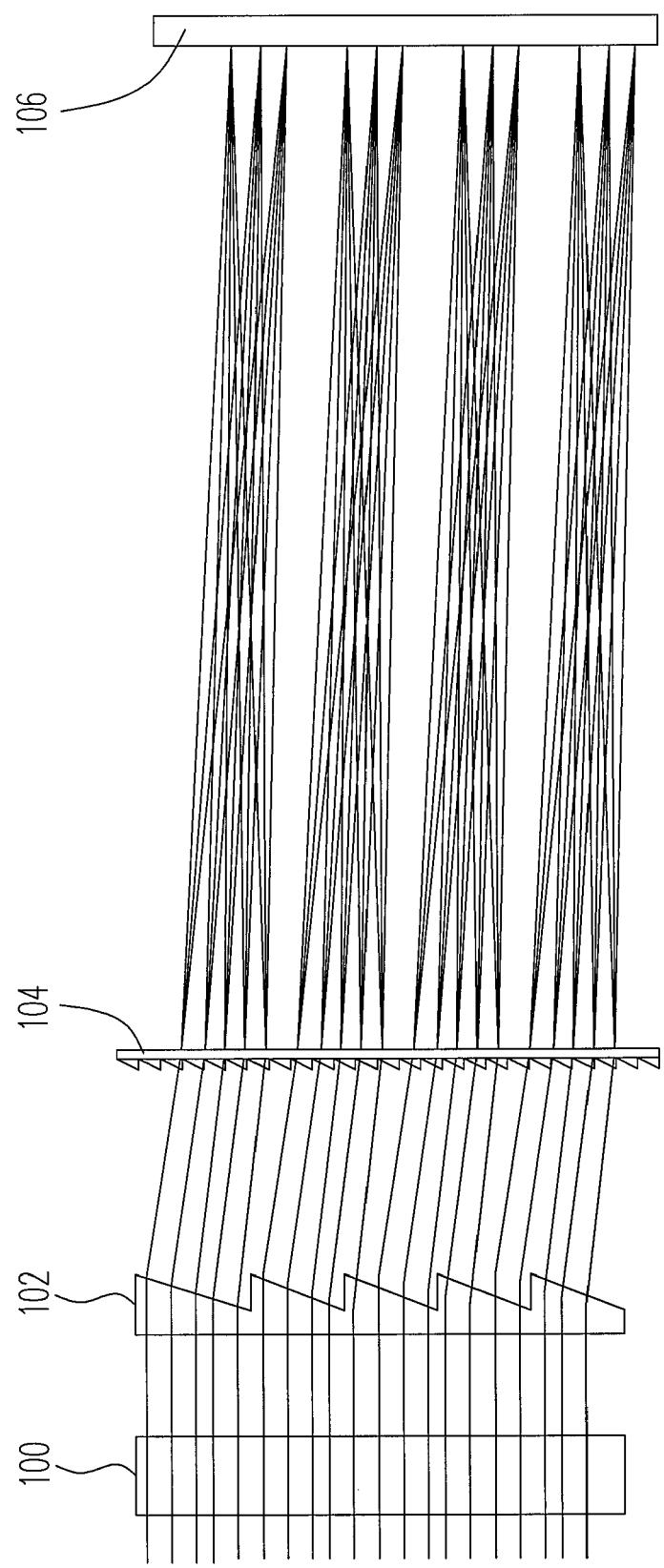
FIG. 2 is a schematic view showing the optical dividing mechanism of FIG. 1 according to one embodiment of the present invention.
Figure 3:
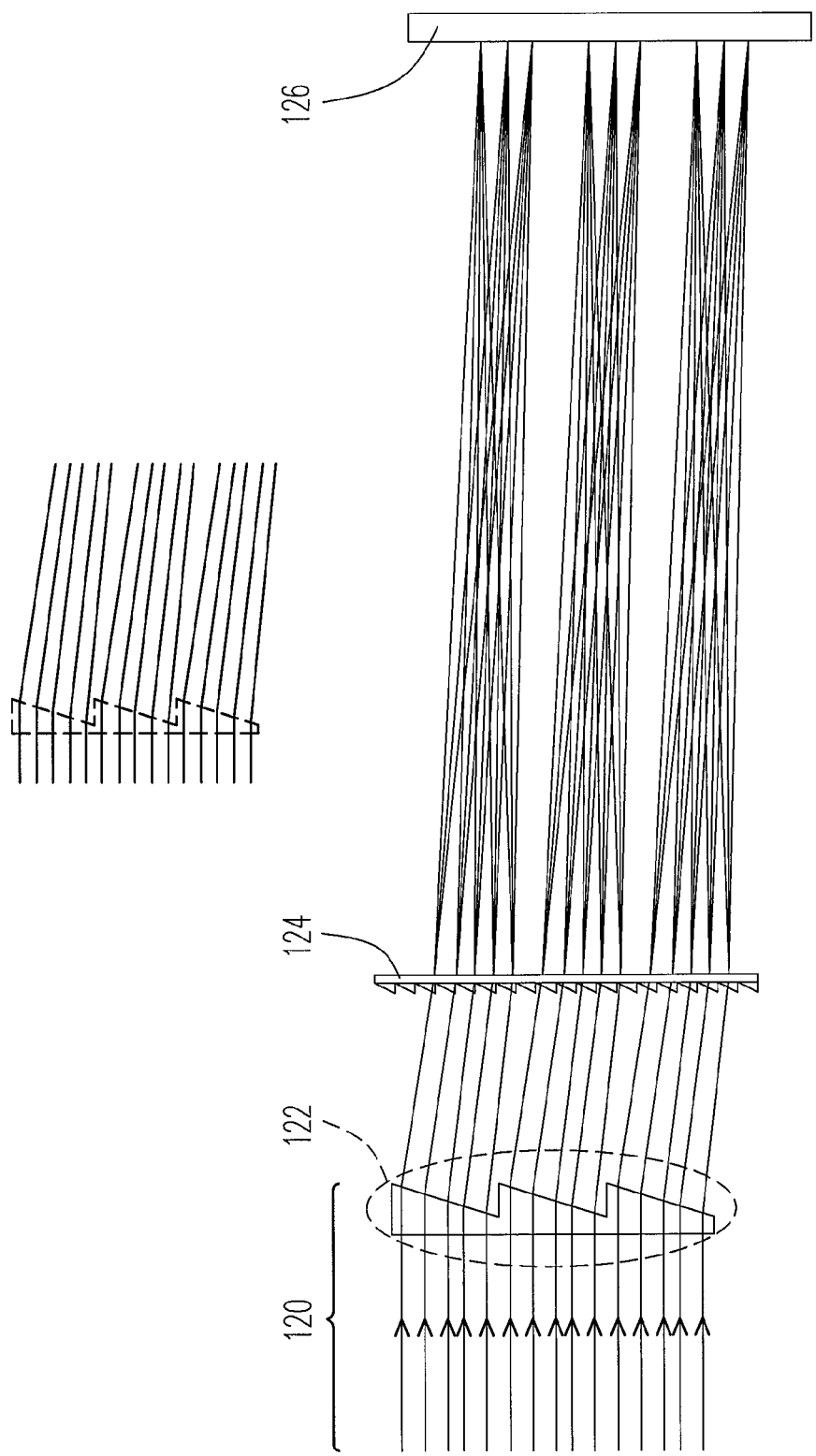
FIG. 3 is a schematic view showing a simplified simulation result according to one embodiment of the present invention.

FIG. 2 is a schematic view showing the light dividing mechanism of the present invention. Referring to FIG. 2, after the incident white light passes through the micro lens plate 100 and the prism plate 102, it enters the diffractive grating plate 104. The diffractive grating plate 104 splits the white light into three primary color lights, i.e., red, green, and blue lights, which are incident on the image display apparatus 106 corresponding to three sub-pixels of each pixel. FIG. 3 is a schematic view illustrating a simplified simulation result of the present invention. Referring to FIG. 3, a parallel light beam 120 is incident on a lens plate 122 having a curved light incident surface. The curved light incident surface has a radius of curvature that is too large to be seen from the drawing and functions to condense the light. The lens plate 122 further has an inclined light emergence surface to deflect the light. Thus, the light is condensed and deflected as shown in an enlarged view on the top portion of FIG. 3. The light is then incident on the diffractive grating plate 124. Through the act of the lens plate 122, the light beam is incident onto the diffractive grating plate 124 at an angle of incidence that can be used to adjust the light emergence direction of the diffractive grating plate 124. Thus, the emerging primary color lights can travel in a direction approximately the same as the direct of the light beam 120.

Figure 7A:
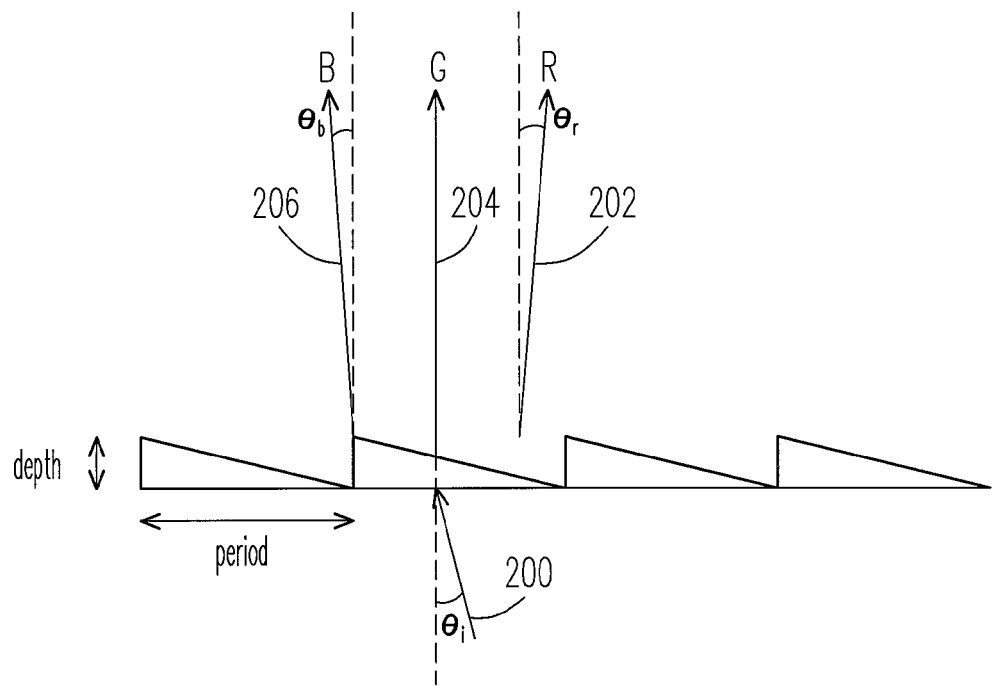
FIGS. 7A-7B are schematic views showing a diffraction mechanism according one embodiment of the present invention.

Now description of the diffraction mechanism is made with reference to FIG. 7A. FIG. 7A is a schematic view illustrating the diffraction mechanism employed in the present invention. This embodiment is described in connection with a grating having multiple micro right-angle prisms in which each micro right-angle prism unit has a fixed period. The period of the micro right-angle prism determines the angle of diffraction, and the depth of the micro right-angle prism determines the directional distribution of the diffraction efficiency. For instance, when the incident light enters the second set of polygon structures, the light is divided into red (R), green (G), and blue (B) primary color light beams. It is assumed that the period of the polygon structures is p, and the wavelengths of the R, G, and B light beams are λr, λg, and λb, respectively. According to equation of diffraction, assuming the light is incident at a right angle, the diffraction angle of the three primary color light beams at m-th diffraction order can be calculated as follows:

$$\theta_r = \sin^{-1}\frac{m\lambda_r}{p},$$
$$\theta_g = \sin^{-1}\frac{m\lambda_g}{p},$$
$$\theta_b = \sin^{-1}\frac{m\lambda_b}{p}.$$
(1)

Because the incident light becomes a condensed and deflected light beam after passing through the first set of periodic polygon structures, the incident light beam has an angle of incidence θi 200. According to the above equations, by adjusting parameters of the equations, the period of the second set of periodic polygon structures can be controlled such that each emerging primary color light beam can be deflected back to be in approximately parallel with the direction of its original incident path. In other words, the three primary color light beams are arranged in approximately parallel with each other and spaced by a distance such that they are incident onto corresponding pixels of the liquid crystal layer at an approximate right angle.

Figure 7B:
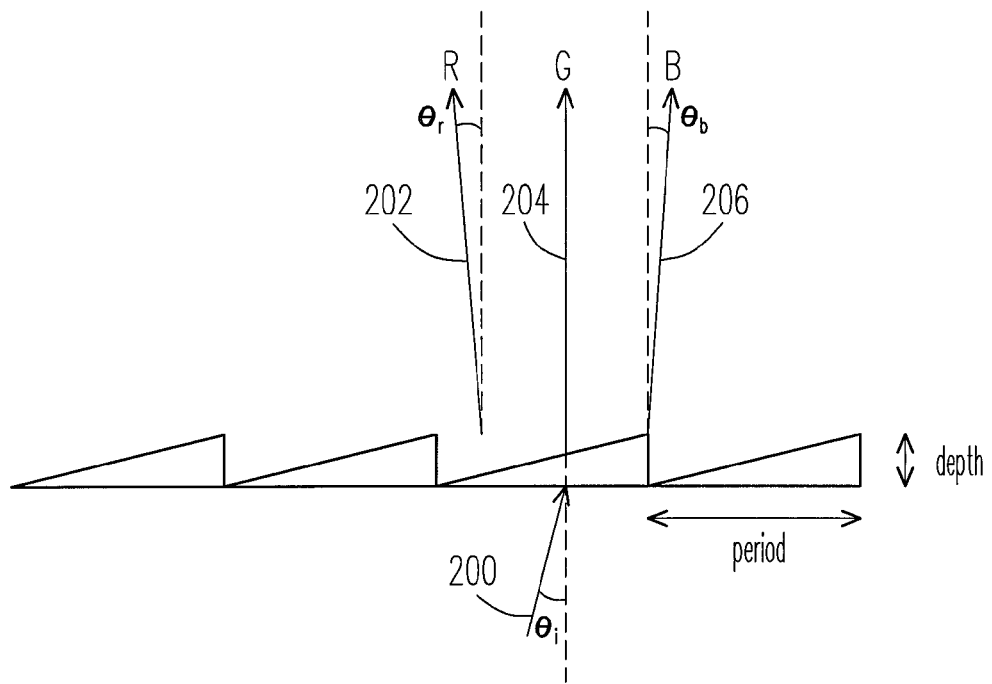
Figure 8A:
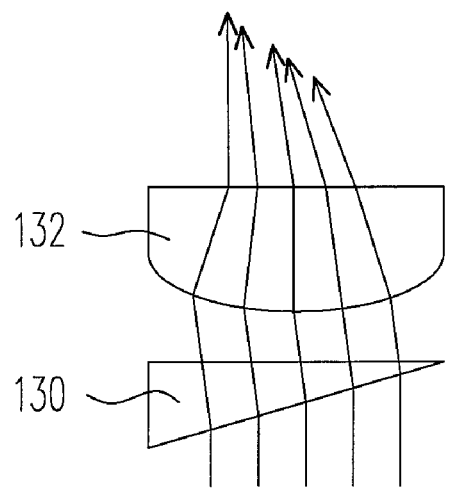
FIGS. 8A-10B are cross-sectional views of micro lens structures of composite optical dividing devices according to another embodiment of the present invention.
Figure 8B:
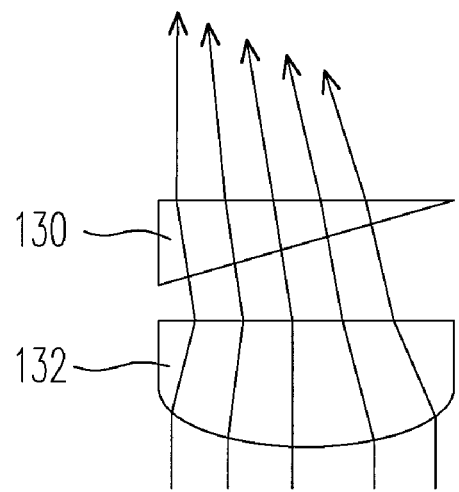
Figure 8C:
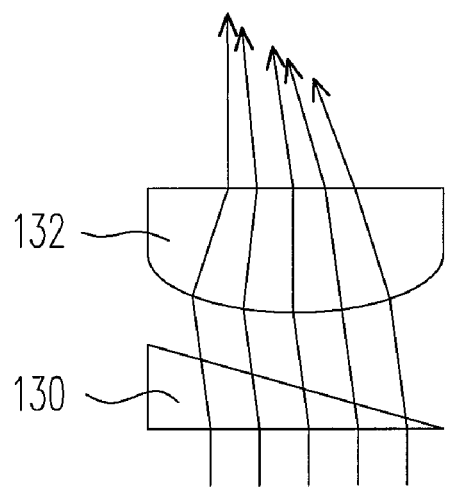
Figure 8D:
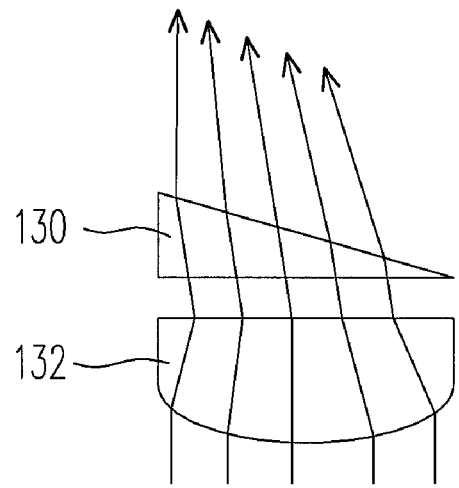
Figure 8E:
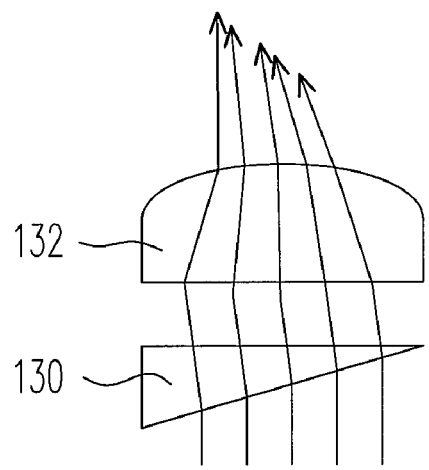
Figure 8F:
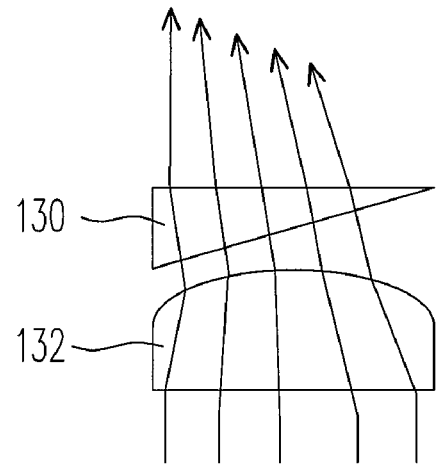
Figure 8G:
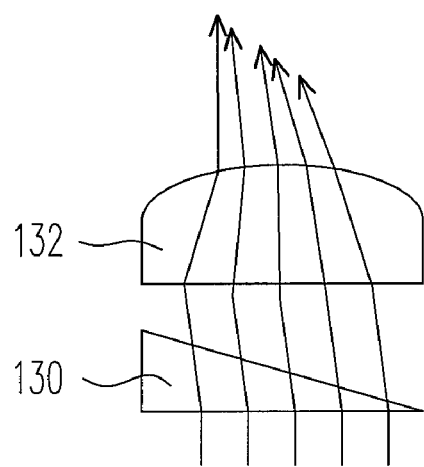
Figure 8H:
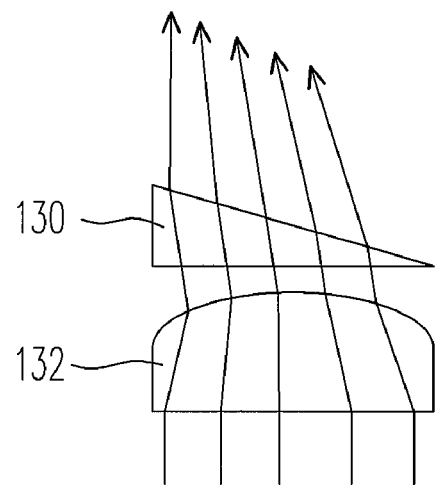
Figure 9A:
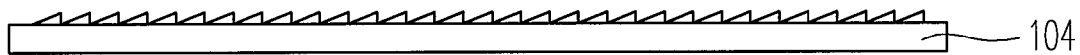
Figure 9B:
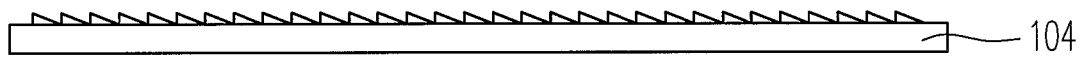
Figure 9C:
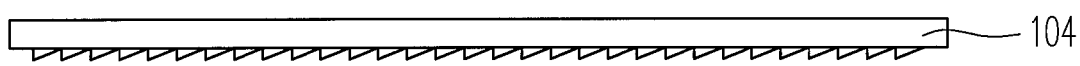
Figure 9D:
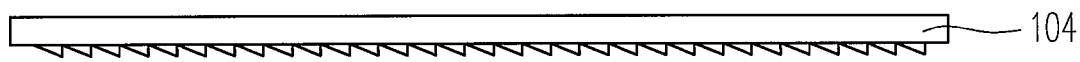

In practice, the shape of the periodic polygon structures can be determined based upon system requirements. For example, in an alternative embodiment illustrated in FIG. 7B, the grating structure can be modified such that the R, G, B light beams can be arranged in an order reverse to that of the arrangement in FIG. 7B. If the polygon structure is a blazed grating having a period of 4 microns and made of a PMMA material, its refractive index is about 1.5. If the angle of incidence θi 200 of an inclined incident light is −7.81° and if the minus first order diffraction beam of such a grating is used, the maximum depth of the grating is about 1 micron. The simulation result shows that, if the wavelengths of the incident lights are 436 nm, 544 nm, and 611 nm, the diffraction efficiency of the minus first order are about 75%, 84%, 79%, and the diffraction angles $\theta_b$, $\theta_g$, $\theta_r$ of the minus first order are 1.56°, 0°, 0.97°, respectively. By changing the angle of incidence, the emergence angle can be varied according to design. Preferably, the emergence angle ranges from 0° to 60°.

Figure 4A:
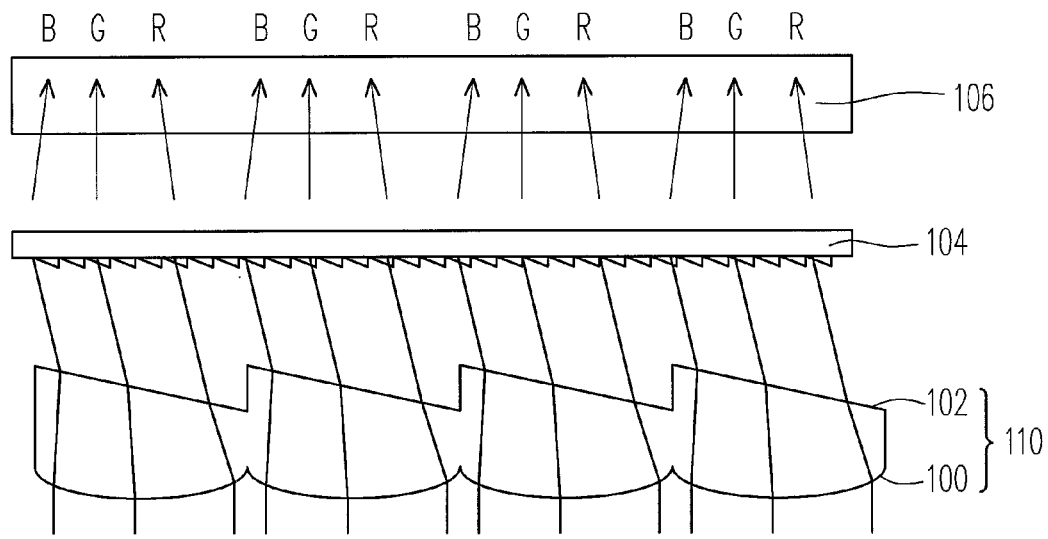
FIGS. 4A-4C are cross-sectional views of composite optical dividing devices employed in an image display apparatus system according to another embodiment of the present invention.
Figure 4B:
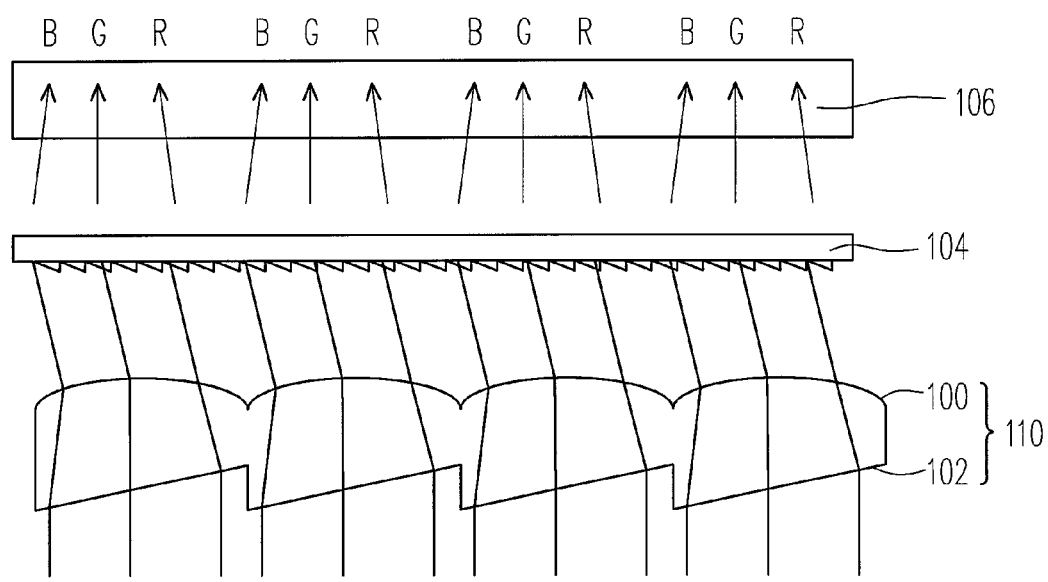
Figure 4C:
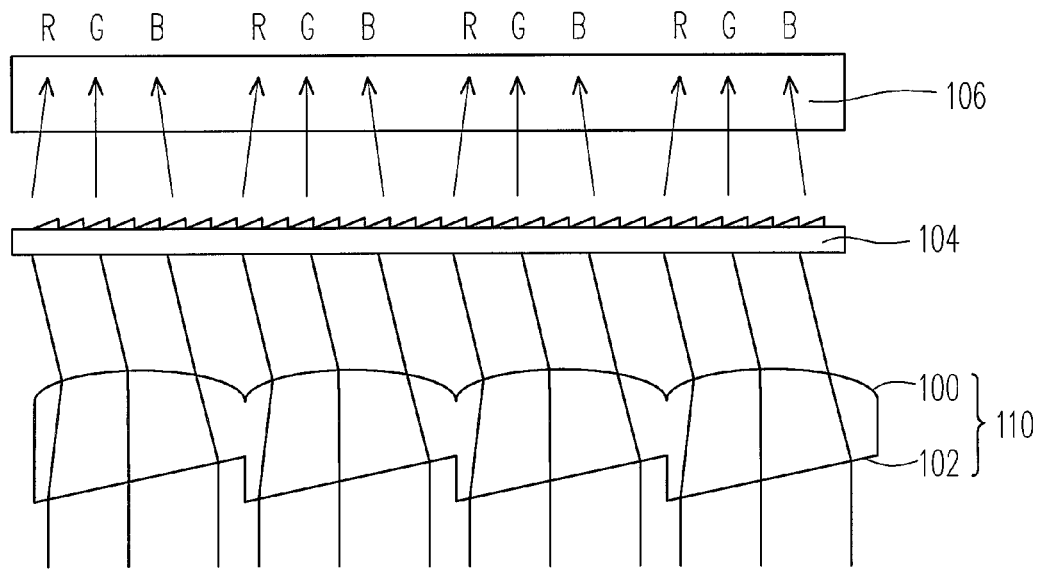

The optical elements can have several alternative designs to realize the function described above. Other embodiments of the present invention are further described below in this regard. FIGS. 4A through 4C illustrate cross-sectional views of composite optical dividing devices having a two-piece structure according to embodiments of the present invention, which are employed in an image display apparatus system. The light dividing mechanism shown in FIG. 4A is similar to the mechanism shown in FIGS. 1A through 1C except that the micro lens plate 100 and the prism plate 102 are integrated into a single optical film 110. In other words, the lens curved surface is formed on one side of a material, and the geometry structure of the prism is directly formed on the other side of the same material, thereby simplifying the assembled structure of the optical film while maintaining the predetermined performance. The curved surface of the micro lens surface 100 provides the function of condensing the light, and the prism surface is mainly presented as inclined surfaces for deflecting the light. In addition, in the present embodiment, the structure surface of the diffractive grating 104 is not limited to the bottom surface (i.e., light incident surface) and could be disposed on the top surface thereof (i.e., light emergence surface). Referring to FIG. 4B which illustrates a light dividing mechanism similar to the mechanism in FIG. 4A, in the present embodiment, the positions of the micro lens surface 100 and the prism surface 102 can be interchanged. Referring to FIG. 4C which illustrates a light dividing mechanism similar to the mechanism in FIG. 4B, in the present embodiment, the structure surface of the diffractive grating plate 104 is disposed on the top surface (i.e., light emergence surface).

Figure 5:
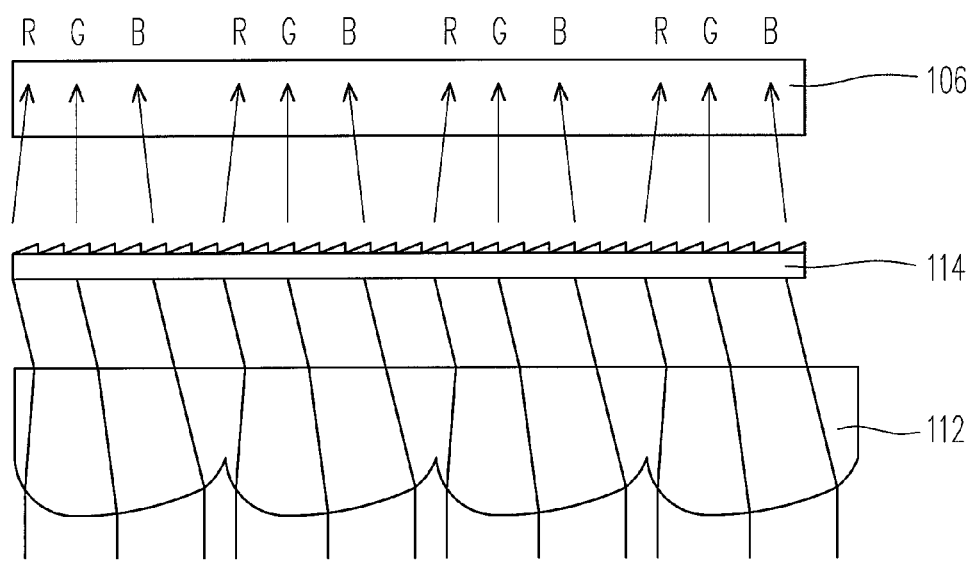
FIG. 5 is a cross-sectional view of composite optical dividing devices employed in an image display apparatus system according to another embodiment of the present invention.

FIG. 5 illustrates a cross-sectional view of a composite optical dividing device having a two-piece structure according to another embodiment of the present invention, which is employed in an image display apparatus system. Referring to FIG. 5, another variation of the optical film 112, also referred to as, for example, a first optical film 112, is shown. The exemplary first optical film 112 of this embodiment is also an integrated single structure. However, the lens surface, for example, the light incident surface, is an asymmetric cylindrical curved surface, and another surface (i.e., light emergence surface) is, for example, a non-inclined surface. The asymmetric cylindrical curved surface condenses and deflects the incident light at the same time. Besides, an optical film 114, also referred to as, for example, a second optical film 114, can have diffractive grating structures formed on a surface of a substrate, for example, on a back surface away from the optical film 112 (i.e., light emergence surface). In other words, the orientation of the second film 114 is opposite to the orientation of the second film 104 of FIG. 4, but the second optical film 114 can still maintain the diffraction function of dividing the incident light into R, G, B lights.

Figure 6A:
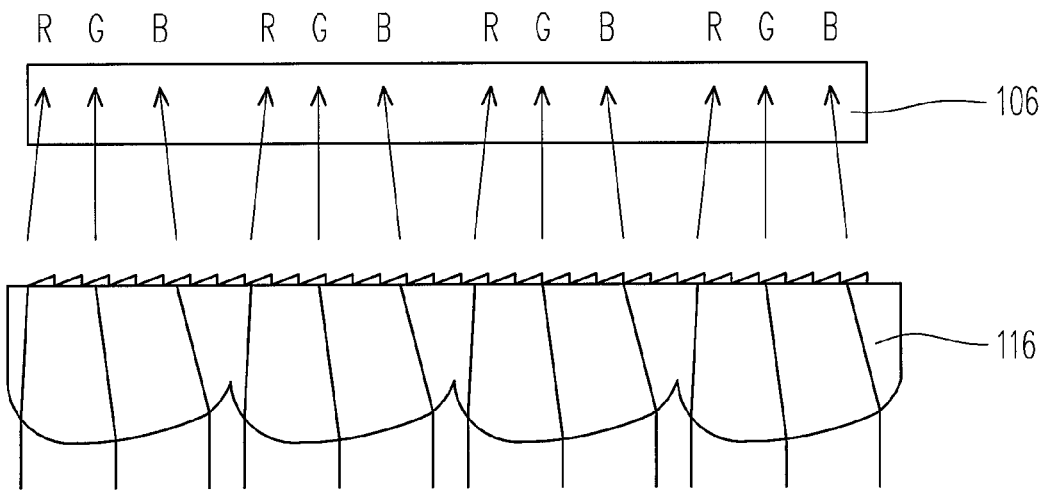
FIGS. 6A-6D are cross-sectional views of composite optical dividing devices employed in an image display apparatus system according to still another embodiment of the present invention.
Figure 6B:
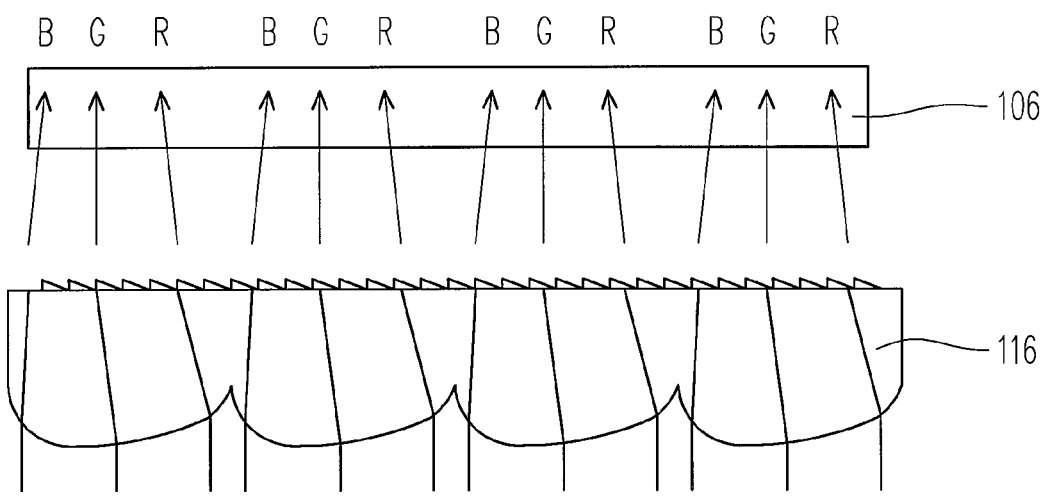

FIGS. 6A through 6D illustrate cross-sectional views of composite optical dividing devices having a single-piece structure according to embodiments of the present invention, which are employed in an image display apparatus system. Referring to FIG. 6A, in the present embodiment, the two optical films described above are further integrated into a single structure to form a single optical film 116. The single optical film 116 is formed, for example, by integrating the optical film 112 and the optical film 114 together. The diffractive grating structure may be directly formed on another side of the optical film 116. Alternatively, the flat substrate of the optical film 114 can be adhered to the plane of the optical film 112 to form the integrated optical film 116. Referring to FIG. 6b, in the present embodiment, modifying the diffractive grating structures on the top surface of the single optical film 116 can indirectly control the direction of the split R, G, B lights. This way of indirectly controlling the direction of the split R, G, B lights by modifying the diffractive grating structures could be equally employed in all the embodiments described above.

Figure 6C:
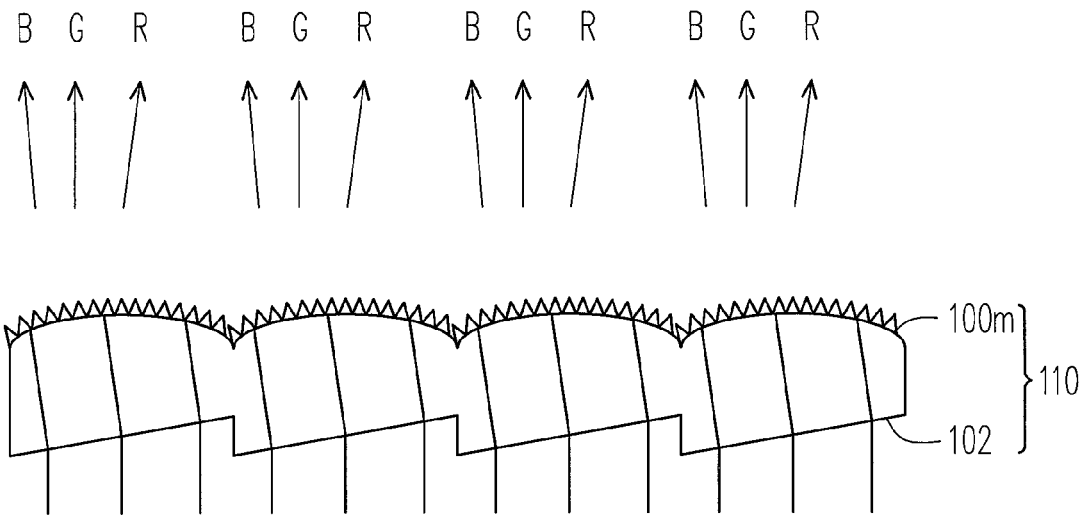
Figure 6D:
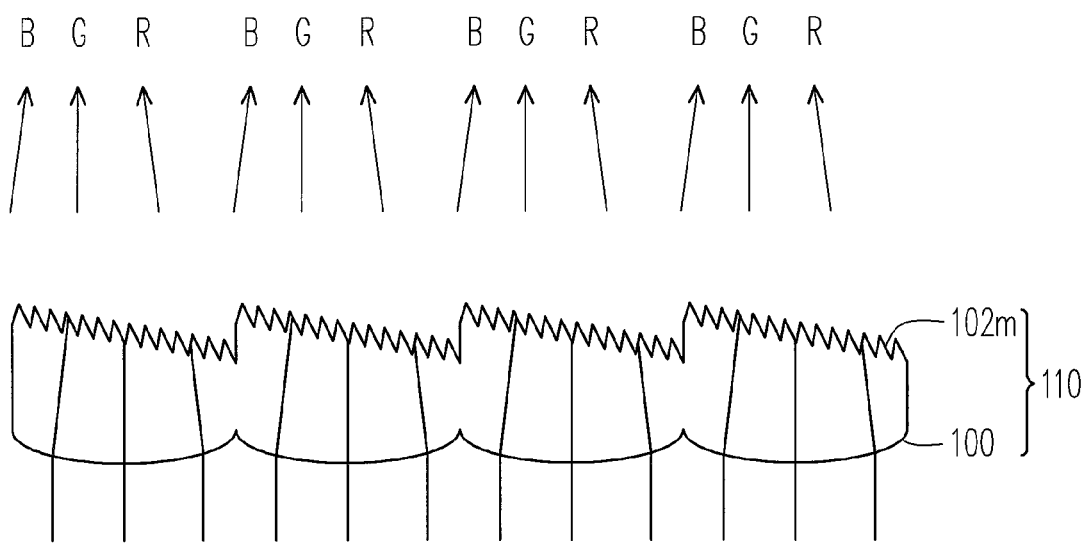

Referring to FIGS. 6C and 6D, diffractive grating structures 100m, 102m may also be directly formed on the top surface of an optical film 110. In other words, the diffractive grating structures 100m, 102m may also be directly formed on the structured curved surface or the prism inclined surface.

FIGS. 8 through 10 illustrate cross-sectional views of micro lens structures of composite optical dividing devices according to embodiments of the present invention, which are used to illustrate different combinations of the micro lens unit and the prism unit. Referring to FIG. 8A, a prism unit 130 for deflecting an incident light may be arranged, for example, on a light incident end to receive the incident light beam, and a symmetric micro lens unit 132 may be disposed behind the prism unit 130. Such an arrangement can also achieve the deflecting and condensing result. Referring to FIG. 8B, when compared with the embodiment of FIG. 8A, the positions of the prism unit 130 and the micro lens unit 132 of FIG. 8B are interchanged, which can still achieve the similar deflecting and condensing result. The actual light paths of the embodiments of FIG. 8A and FIG. 8B are slightly different, which results in different degrees of deflecting and condensing to meet different actual design requirements. Other variations of the micro lens structure may be combinations illustrated in FIGS. 8C through 8H or alternative other combinations under the same optical principles. In addition, the diffractive grating plate 104 of FIG. 1 and the optical film 114 of FIG. 5 are used as light dividing units. Changing the orientation of the light dividing structure or the location of the structure surface on the substrate, i.e., on the top surface or the bottom surface, can result in desired optical dividing results. The variations shown in FIGS. 9A through 9D can be selectively used to meet actual design requirements.

Figure 10A:
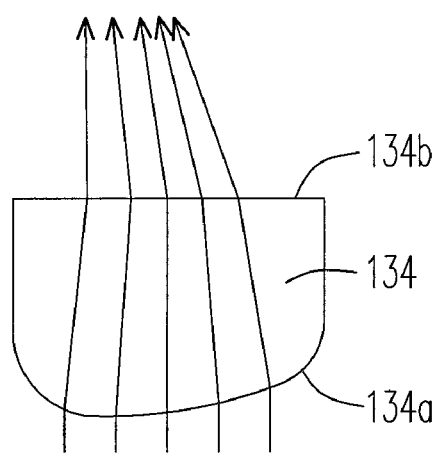
Figure 10B:
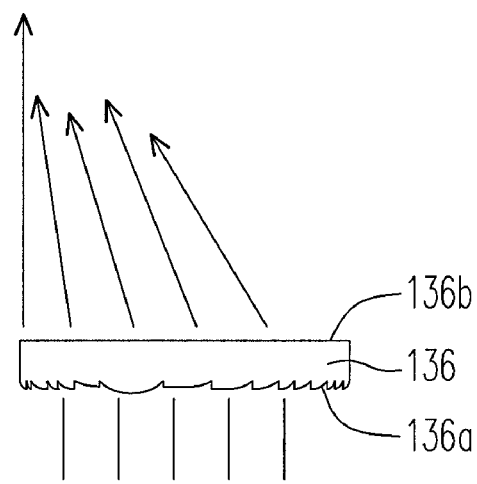

Referring to FIG. 10A, the micro lens unit 134 is, for example, an integrated single structure having an asymmetric curved surface 134a and a flat surface 134b. The flat surface 134b may be inclined or not. However, a non-inclined flat surface facilitates subsequent alignment and integration with the optical film. Furthermore, for the consideration of component thickness, the structure of FIG. 10A can be further modified to reduce the thickness of the lens. FIG. 10B illustrates a micro lens unit 136 that is achieved by modifying the structure of FIG. 10A. A flat surface 136b of the micro lens unit 136 is, for example, the same as the flat surface 134b of the micro lens unit 134. However, a serrated structure surface 136a corresponds to a smooth curved surface, for example, the aspheric curved surface 134a, and can be formed according to the binary principle to have a reduced thickness. The micro lens unit 136 can still achieve the light deflecting and condensing result while having a generally reduced thickness, thus reducing the system weight and size. The binary principle used herein is described below. In an optical design, lens surface relief can control the optical field distribution after an incident light passes through the lens because the surface relief generates a phase shift of the incident light.

Figures 11A, 11B, 11C:
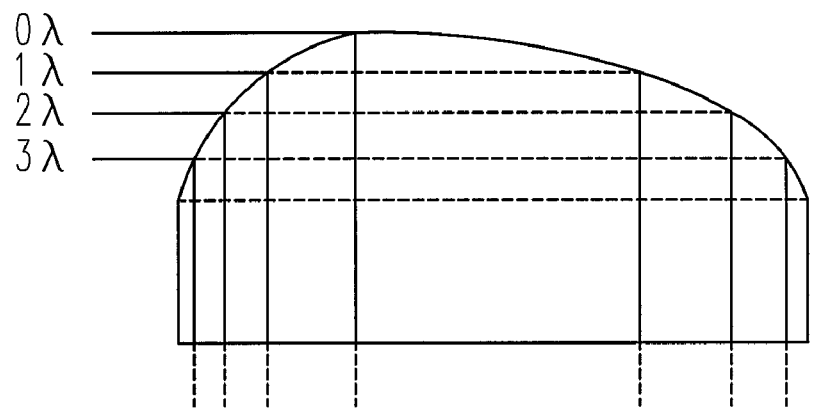
FIGS. 11A-11C are schematic views showing the thickness reduction of the micro lens structure according to binary optical principle.

FIG. 11A illustrates the change in the height of the lens corresponding to a continuous phase function. According to the optical diffraction theory, the phase values of the continuous phase function can be modulated into the interval between 0~2π by subtracting an integer multiple of 2π regarding a central wavelength, and the result is illustrated in FIG. 11B. The maximum height of the surface of such a structure is given by the equation $d_{max}=\lambda/(n-1)$, wherein n is the refraction index of the lens material for a given wavelength λ. In order to simplify the fabrication process, the phase distribution can be quantized into N discrete heights, resulting in a 2π/N phase distribution. This 2π/N phase distribution is similar to a multiple-steps surface distribution. The height of each of the N steps is $d_M=d_{max}/2^M$, wherein $N=2^M$, for example, and M is a natural number, as shown in FIG. 11C. One feature of this structure is that the micro lens unit can maintain the optical distribution of emergence lights while having a reduced thickness.

Figure 12A:
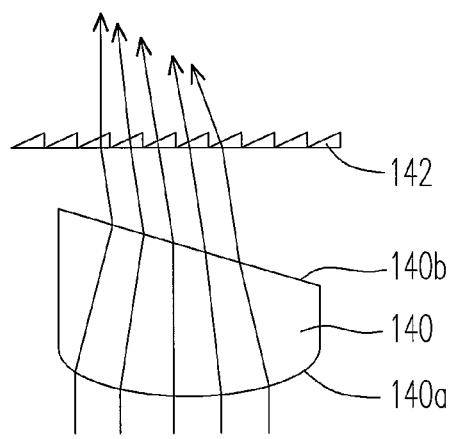
FIGS. 12A-12C are cross-sectional views of composite optical dividing devices employed in an image display apparatus system according to still another embodiment of the present invention.
Figure 12B:
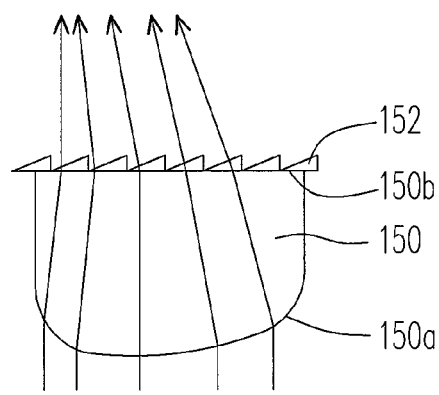
Figure 12C:
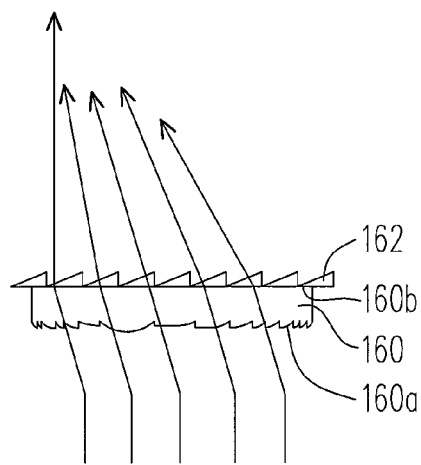

Referring to FIG. 12A, for the arrangement having two optical films, the micro-structure lens comprises, for example, a micro lens unit 140 and a diffractive grating plate 142. The structure of the micro lens unit 140 may be similar to the structure of FIG. 4. That is, a smooth curved surface 140a of the micro lens unit 140 is a symmetric curved surface, and a flat surface 140b of the micro lens unit 140 is an inclined flat surface. The diffractive grating plate 142 is disposed separately from the micro lens unit 140. Referring to FIG. 12B, the structure of the micro lens unit 150 may be similar to the structure of FIG. 10A, for example. The smooth curved surface 150a is asymmetric, and the flat surface 150b is not inclined, for example. It can be understood that, whether the flat surface 150b is designed to be inclined or not can be adjusted in accordance with the operation of diffractive grating plate 152. The micro lens unit 150 is capable of deflecting and condensing the light with a sufficient degree because the smooth curved surface 150a is asymmetric. The flat surfaces 150b of adjacent micro lens units 150 are the same, which makes it possible that the grating plate 152 can be directly fabricated on or adhered to the flat surface 150b to form a single structure. Referring to FIG. 12C, the micro lens unit 160 has the structure of FIG. 10B, which includes a flat surface 160b and non-smooth curved surface 160a. As described above, the grating plate 162 and the micro lens unit 160 can be integrated into a single structure.

In summary, the above-described embodiments of the present invention can be practiced in suitable combination with one another and variations thereof can be made according to actual requirements. The present invention should not be limited to the embodiments described herein.

Figure 13:
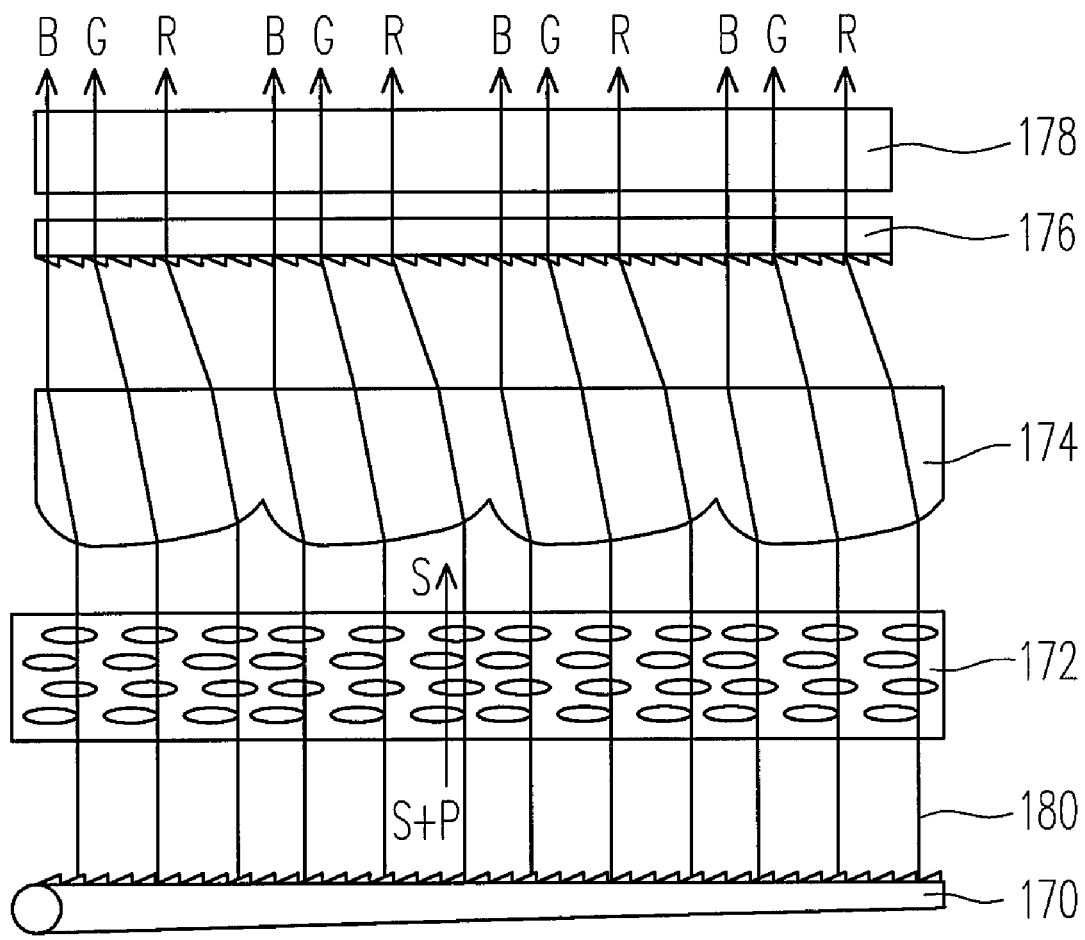
FIG. 13 is a schematic view showing an image apparatus system according to one embodiment of the present invention.

The application of the present invention in image display apparatus is discussed below. In such an application, a polarizer may be added, for example. FIG. 13 is a cross-sectional view of an image display apparatus system according to another embodiment of the present invention. Referring to FIG. 13, the image display apparatus 178 is illustrated as a liquid display apparatus for the purpose of description only. It should be understood that the present invention can be equally used in other systems, such as, the charge coupled device (CCD) of a digital camera or a color video camera. When used in such other systems, the present invention operates in the same principle and includes the similar structure except that the light source is the external object.

The light source 180 needed by the image apparatus 178 is generated by a backlight module 170. The backlight module 170 generates a plane light source which is generally not polarized. The plane light source is, for example, a light with mixed P and S polarization states. After passing through a polarizer 172, the light source 180 becomes a S-polarized light source 180. The light source 180 then passes through an optical film 174. Similar to those described above, the optical film 174 includes micro-structure lenses that condense and deflect the light source 180 passed therethrough. Next, the light source 180 passes through a diffractive grating plate 176. By selecting an appropriate angle of incidence, the light source 180 passing through the diffractive grating plate 176 is divided by the diffractive grating plate 176 into R, G, B lights that are directed toward and incident onto the image display apparatus 178 in a generally same direction. The positions of sub-pixels of the image display apparatus 178 correspond to the incident positions of the R, G, B lights, thus forming a color pixel. As such, the color filter is not required in the present embodiment to obtain color pixels.

Before passing through the polarizer 172, the original incident light contains both light components of P and S polarization states. The light travels back and forth between the polarizer and a reflective layer, which results in an emergence light having a specific polarization direction, for example, an S polarization direction. In regard to such a polarized light, the periodic polygon structure can be optimized to further improve the efficiency of a split emergence light in a certain polarization direction.

The micro-structure optical elements of the present invention can be fabricated by injection molding. The mold core of the injection mold can be fabricated using a photolithography process or an ultra-precision machining technology which uses a single crystal diamond tool to machine the mold core.

The key element is the periodic polygon structures. For instance, when used in a display panel, the first set of periodic polygon structures of the element has the function of reducing the light beam diameter and deflecting the incident light, and the second set has the function of dividing the light. Preferably, the light source used herein mainly consists of three primary color lights, and more specifically, may be a RGB LED or a RGB CCFL, which has a spectrum of three primary colors, such as, R (611 nm), G (544 nm), and B (436 nm).

After the light emerges from the backlight module 170, it is incident onto the image display system as parallel light beams. With respect to function, each unit corresponding to a position of one pixel is considered a combination of a refractive prism and a condenser lens. To simplify the fabrication process, it can be configured to be an aspheric lens. The purpose of condensing the light is to position the focus of various color light beams split from the incident light around a liquid crystal layer or an image sensor, thereby facilitating the processing of the optical signals and reducing cross-talk therebetween. For instance, when used in a display panel having a pixel size of 219×219 μm$^2$, the light is condensed by the first set of periodic polygon structures.

With respect to actual function, in one embodiment of the present invention, the high efficiency optical dividing device may include a first optical film having multiple micro-structure lenses of a same shape to condense and deflect the incident light. The optical dividing device may further include a second optical film having multiple periodic polygon structures. The periodic polygon structures split the light passing through the first optical film into light beams of different wavelengths. The light beams of different wavelengths are separated according to their wavelengths. The divided light beams can emerge from the second optical film in a direction that is, for example, the same as the original incident direction, or at a specific angle relative to the original incident direction. In various embodiments of the present invention, this specific angle ranges from 0° to 60°.

In one exemplary embodiment, the first optical film has a light incident surface and a light emergence surface. The micro-structure lenses of a same shape can be directly fabricated on the light incident surface or light emergence surface according to actual requirements.

In another exemplary embodiment, the micro-structure lenses of a same shape on the first optical film can be a smooth curved surface or a diffractive micro-structure surface and have the function of condensing and deflecting a light. The shape of the micro-structure lenses varies with the refraction index of the material thereof.

In another exemplary embodiment, the second optical film has a light incident surface and a light emergence surface. The periodic polygon structures can be directly fabricated on the light incident surface or light emergence surface according to actual requirements.

In another exemplary embodiment, the periodic polygon structures on the second optical film can be a blazed grating, polygon grating, or a sub-wavelength grating, which has a grating period ranging from 0.1λ to 10λ.

In another exemplary embodiment, both the micro-structure lenses of a same shape on the first optical film and the periodic polygon structures on the second optical film are one dimensional structures.

In another exemplary embodiment, both the micro-structure lenses of a same shape on the first optical film and the periodic polygon structures on the second optical film are two dimensional structures.

In another exemplary embodiment, when used in an opto-mechanical system for a TFT-LCD, the focus of the emerging color light beams processed by the composite optical dividing device can be positioned within the liquid crystal layer. For example, this can increase the positional tolerance between the composite optical dividing device and the liquid crystal layer during assembly.

In another exemplary embodiment, the composite optical dividing device can be employed in opto-mechanical systems such as, display panels, color video cameras, or digital cameras.

In addition, the high efficiency optical dividing device may be configured to be a single structure. The single structure includes an optical film having a light incident surface and a light emergence surface. Multiple micro-structure lenses of a same shape, for example, can be formed on the light incident surface to condense and deflect an incident light. Multiple periodic polygon structures, for example, can be formed on the light emergence surface to divide the light passing through the first optical film into light beams of different wavelengths. The light beams of different wavelengths are separated according to their wavelengths. The divided light beams can emerge from the second optical film in a direction that is, for example, the same as the original incident direction, or at a specific angle relative to the original incident direction. In various embodiments of the present invention, this specific angle ranges from 0° to 60°, for example.

As a basic concept of the present invention, a lens structure is used to deflect and condense the light beam corresponding to the positions of pixels, and a diffractive grating structure is used to divide the light into different color light beams. It is contemplated that the lens structure and the diffractive grating structure can be used in different combinations, and further can be integrated into a single structure. As a result, the present invention eliminates the use of the color filter.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A composite optical dividing device for receiving an incident light beam which is a mixture of multiple light beams of different wavelengths, the composite optical dividing device comprising:
   an optical film having a light incident surface and a light emergence surface;
   wherein the light incident surface is provided with a plurality of micro-structure lenses, each of the micro-structure lenses has an asymmetrical curved surface or a structure surface having a reduced thickness corresponding to the asymmetrical curved surface, and each of the micro-structure lens is configured to condense and deflect the incident light beam into one unit of deflected beam;
   wherein the light emergence surface is provided with a plurality of periodic continuous triangular/tetrahedral structures for receiving the units of deflected beam of the incident light beam passing through the light incident surface and dividing the incident light beam into the light beams of different wavelengths.

2. The composite optical dividing device according to claim 1, wherein the micro-structure lenses are positioned corresponding to a plurality of pixels of a display pixel array, respectively.

3. The composite optical dividing device according to claim 1, wherein the continuous triangular/tetrahedral structures on the light emerging surface are triangular prism structures.

4. The composite optical dividing device according to claim 1, wherein, according to a diffraction mechanism, the continuous triangular/tetrahedral structures on the light emerging surface split the incident light beams passing through the micro-structure lenses into the light beams of different wavelengths and direct the divided light beams toward a plurality of predetermined areas on a plane.

5. The composite optical dividing device according to claim 4, wherein the predetermined areas on the plane are positions of a plurality of sub-pixels of a liquid display panel.

6. The composite optical dividing device according to claim 1, wherein each of the micro-structure lenses at the light incident surface is the structure surface having a reduced thickness corresponding to the asymmetrical curved surface.

* * * * *